(12) United States Patent
Huang

(10) Patent No.: US 12,077,203 B2
(45) Date of Patent: Sep. 3, 2024

(54) WHEEL DOLLY STORAGE APPARATUS AND METHOD

(71) Applicant: Jackco Transnational Inc., Azusa, CA (US)

(72) Inventor: John Huang, Azusa, CA (US)

(73) Assignee: Jackco Transnational Inc., Azusa, CA (US)

( * ) Notice: Subject to any disclaimer, the term of this patent is extended or adjusted under 35 U.S.C. 154(b) by 0 days.

(21) Appl. No.: 18/351,040

(22) Filed: Jul. 12, 2023

(65) Prior Publication Data

US 2024/0059333 A1 Feb. 22, 2024

Related U.S. Application Data

(60) Provisional application No. 63/389,551, filed on Jul. 15, 2022.

(51) Int. Cl.
  *B62B 3/10* (2006.01)
  *B62B 3/04* (2006.01)

(52) U.S. Cl.
  CPC ............. *B62B 3/04* (2013.01); *B62B 3/10* (2013.01); *B62B 2202/90* (2013.01); *B62B 2203/20* (2013.01); *B62B 2301/044* (2013.01); *B62B 2501/06* (2013.01)

(58) Field of Classification Search
  CPC ........... B62B 2202/90; B62B 2203/20; B62B 2301/044; B62B 2501/06; B62B 3/10; B62B 3/108; A47F 5/108
  USPC .......................... 211/27, 85.8; 280/79.3, 79.7
  See application file for complete search history.

(56) References Cited

U.S. PATENT DOCUMENTS

| | | | | |
|---|---|---|---|---|
| 449,654 | A * | 4/1891 | Albin et al. | A47F 7/30 211/27 |
| 525,162 | A * | 8/1894 | Marenger | A47B 57/565 211/27 |
| 781,184 | A * | 1/1905 | Bustin | A47F 7/30 211/27 |
| 4,098,518 | A * | 7/1978 | Minkoff | B62B 5/0083 280/47.131 |

(Continued)

OTHER PUBLICATIONS

Brave, "Dolly Storage and Titan—Brave Search", [Online]. Retrieved from the Internet: <https://search.brave.com/images?q=dolly+storage+and+titan&source=web#1>, (Accessed online Apr. 12, 2022), 8 pages.

(Continued)

*Primary Examiner* — Jennifer E. Novosad
(74) *Attorney, Agent, or Firm* — Schwegman Lundberg & Woessner, P.A.

(57) ABSTRACT

Apparatus and methods for wheel dolly storage. An apparatus includes a first elongated arm and a plurality of vertical support structures configured to be affixed to a horizontal surface of the first elongated arm. Each of the plurality of vertical support structures is configured to be inserted into an end portion of a wheel dolly to support the wheel dolly in a vertical orientation. The apparatus also includes a connector portion configured to be affixed to an end of the first elongated arm. A second arm is configured to be affixed to the connector portion on a first end. A second end of the second arm opposite the first end is configured to be inserted into an end portion of a base wheel dolly while the first elongated arm rests on the base wheel dolly.

20 Claims, 8 Drawing Sheets

(56) References Cited

U.S. PATENT DOCUMENTS

| | | | | |
|---|---|---|---|---|
| 4,895,381 | A * | 1/1990 | Farlow | B62B 3/02 211/208 |
| 5,253,887 | A * | 10/1993 | Marenger | B62B 3/108 280/651 |
| 5,871,219 | A * | 2/1999 | Elliott | B62B 3/108 280/47.35 |
| 6,206,385 | B1 * | 3/2001 | Kern | B62B 3/008 280/47.35 |
| 6,296,262 | B1 * | 10/2001 | Skinner | B62B 3/108 280/35 |
| 6,523,776 | B1 * | 2/2003 | Elder | B65H 49/325 211/85.5 |
| 6,786,503 | B1 * | 9/2004 | Young | B62B 3/008 280/35 |
| 7,017,940 | B2 * | 3/2006 | Hatfull | B62B 1/208 280/63 |
| 7,185,899 | B2 * | 3/2007 | Thiede | A47B 46/00 280/47.35 |
| 7,223,057 | B2 * | 5/2007 | Bellis, Jr. | B60P 3/122 414/373 |
| 7,950,533 | B2 * | 5/2011 | Adams | A47F 5/01 211/113 |
| 8,342,544 | B1 * | 1/2013 | Blewett | B62B 3/022 211/195 |
| 8,348,287 | B1 * | 1/2013 | Smith | B62B 3/108 280/47.35 |
| 8,641,061 | B1 * | 2/2014 | Sims | B62B 3/108 280/651 |
| 8,714,369 | B2 * | 5/2014 | Liu | A47F 7/30 211/175 |
| 10,407,087 | B1 * | 9/2019 | Baker | B62B 3/005 |
| 11,787,456 | B2 * | 10/2023 | Boggs | B62B 3/02 280/33.991 |
| 2002/0113390 | A1 * | 8/2002 | Hallman | B62B 3/108 280/43 |
| 2005/0225047 | A1 * | 10/2005 | Schilling | B62B 5/0086 280/79.7 |
| 2005/0254923 | A1 * | 11/2005 | Gorski | B62B 3/104 414/426 |
| 2007/0085287 | A1 * | 4/2007 | Wyse | B62B 3/108 280/79.3 |
| 2010/0237577 | A1 * | 9/2010 | Bolster | B62B 3/0643 280/79.7 |
| 2014/0265189 | A1 * | 9/2014 | Drowanowski | B62B 1/12 280/47.17 |
| 2016/0157637 | A1 * | 6/2016 | Hokanson | B65G 1/02 211/85.8 |
| 2017/0036685 | A1 * | 2/2017 | Spence | B62B 3/108 |
| 2017/0106778 | A1 * | 4/2017 | McConn | B62B 1/06 |
| 2018/0050716 | A1 * | 2/2018 | Tarrant | B62B 5/0086 |
| 2024/0059333 | A1 * | 2/2024 | Huang | B62B 3/04 |

OTHER PUBLICATIONS

Brave, "Dolly Storage Rack search Brave", [Online]. Retrieved from the Internet: <https://search.brave.com/images?q=Summit%20Racing%20SUM-918046%20-%20Summit%20Racing%E2%84%A2%20Ratcheting%20Dolly%20Storage%20Racks#2>, (Accessed online Apr. 12, 2022), 2 pages.

Google, "Hydraulic Wheel Dolly", [Online]. Retrieved from the Internet: <https://www.google.com/search> + hydraulic wheel dolly, (Accessed online Apr. 12, 2022), 3 pages.

Harbor Freight, "Daytona Wheel Dolly Storage Rack", [Online]. Retrieved from the Internet: <https://www.harborfreight.com/wheel-dolly-storage-rack-64496.html>, (Accessed online Apr. 12, 2022), 7 pages.

Summit Racing Equipment, "Summit Racing SUM-918046—Summit Racing ™ Ratcheting Dolly Storage Racks", [Online]. Retrieved from the Internet: <https://www.summitracing.com/parts/sum-918046>, (Accessed online Apr. 12, 2022), 6 pages.

Summit Racing Equipment, "GoJak G567R—GoJak Dolly Racks", [Online]. Retrieved from the Internet: <https://www.summitracing.com/parts/ztc-g567r>, (Accessed online Apr. 12, 2022), 7 pages.

* cited by examiner

WHEEL DOLLY STORAGE APPARATUS AND METHOD

CROSS-REFERENCE TO RELATED APPLICATION

This patent application claims the benefit of U.S. Provisional Patent Application No. 63/389,551, filed Jul. 15, 2022, which is incorporated by reference herein in its entirety.

TECHNICAL FIELD

The present subject matter described herein generally relates to mechanical stands for storage and, for example and without limitation, to apparatus, systems and methods for wheel dolly storage.

BACKGROUND

A dolly is commonly used to move heavy or bulk loads. Common shop dollies include a metallic frame with a number of casters or wheels, and are configured to support a heavy or bulk load to assist a user in moving the load. When not in use, dollies can take up valuable work space and create a hazard to persons moving within the work space. An improved wheel dolly storage apparatus and method is needed.

SUMMARY

Disclosed herein, among other things, are apparatus and methods for wheel dolly storage. One aspect of the present subject matter includes an apparatus including a first elongated arm and a plurality of vertical support structures configured to be affixed to a horizontal surface of the first elongated arm. Each of the plurality of vertical support structures is configured to be inserted into an end portion of a wheel dolly to support the wheel dolly in a vertical orientation. The apparatus also includes a connector portion configured to be affixed to an end of the first elongated arm such that the connector portion is substantially perpendicular to the first elongated arm. A second arm is configured to be affixed to the connector portion on a first end such that the second arm is substantially parallel with the first elongated arm. A second end of the second arm opposite the first end is configured to be inserted into an end portion of a base wheel dolly while the first elongated arm rests on the base wheel dolly such that casters of the base wheel dolly provide support and maneuverability for the apparatus.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

BRIEF DESCRIPTION OF THE DRAWINGS

Some embodiments are illustrated by way of example, and not of limitation, in the figures of the accompanying drawings, which are not necessarily drawn to scale, in which.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

Common shop dollies include a metallic frame with a number of casters or wheels, and are configured to support a heavy or bulk load to assist a user in moving the load. When not in use, dollies can take up valuable work space and create a hazard to persons moving within the work space.

The present subject matter provides an apparatus, referred to herein as a mechanical stand, configured to use one wheel dolly as a base and connect to a plurality of other wheel dollies to store them when not in use. In various embodiments, the plurality of other when dollies are stored in a vertical or upright position.

Figure 1A:
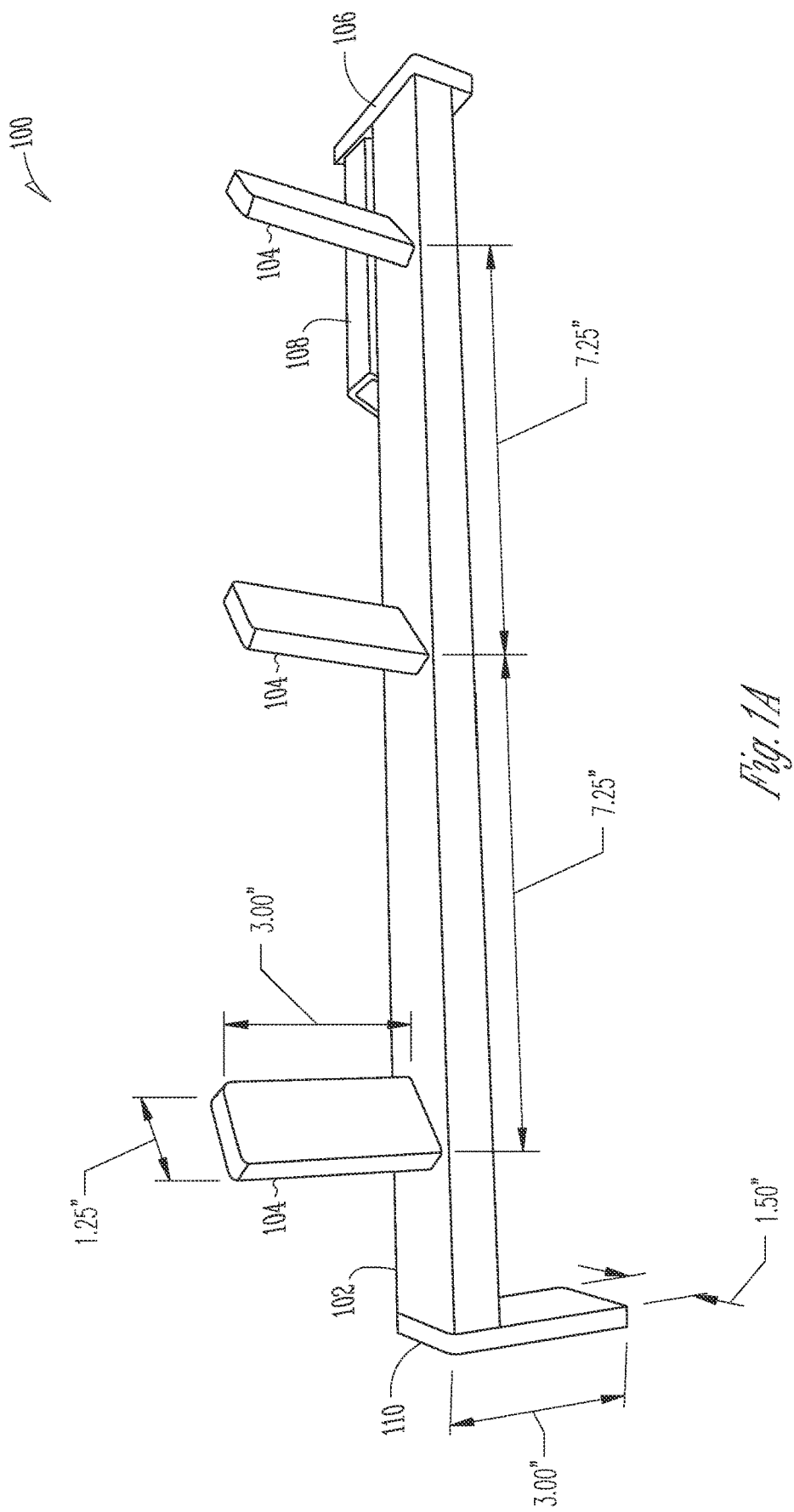
FIGS. 1A-1D illustrate various views of an apparatus for wheel dolly storage, according to various embodiments of the present subject matter.
Figure 1B:
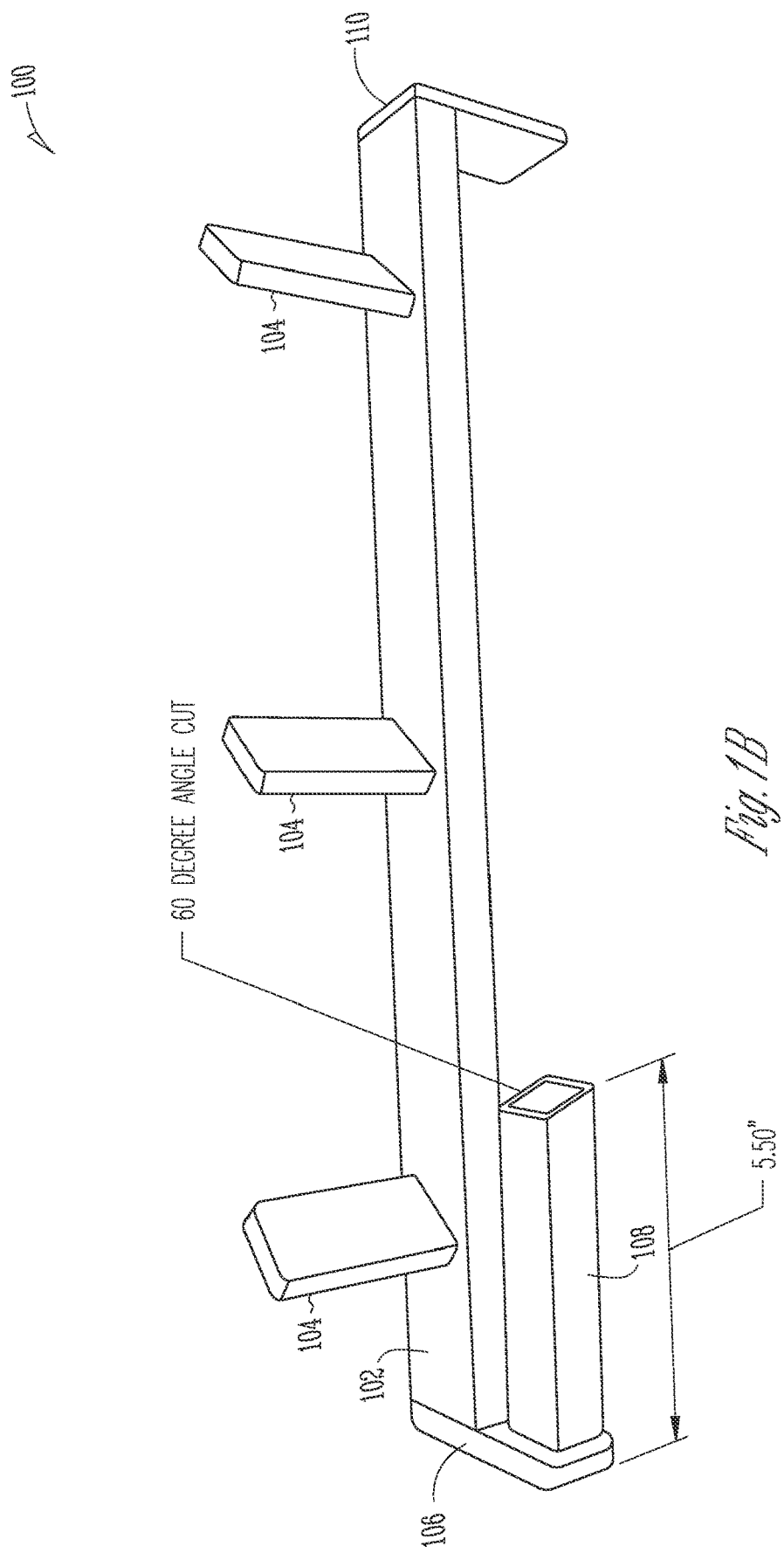
Figure 1C:
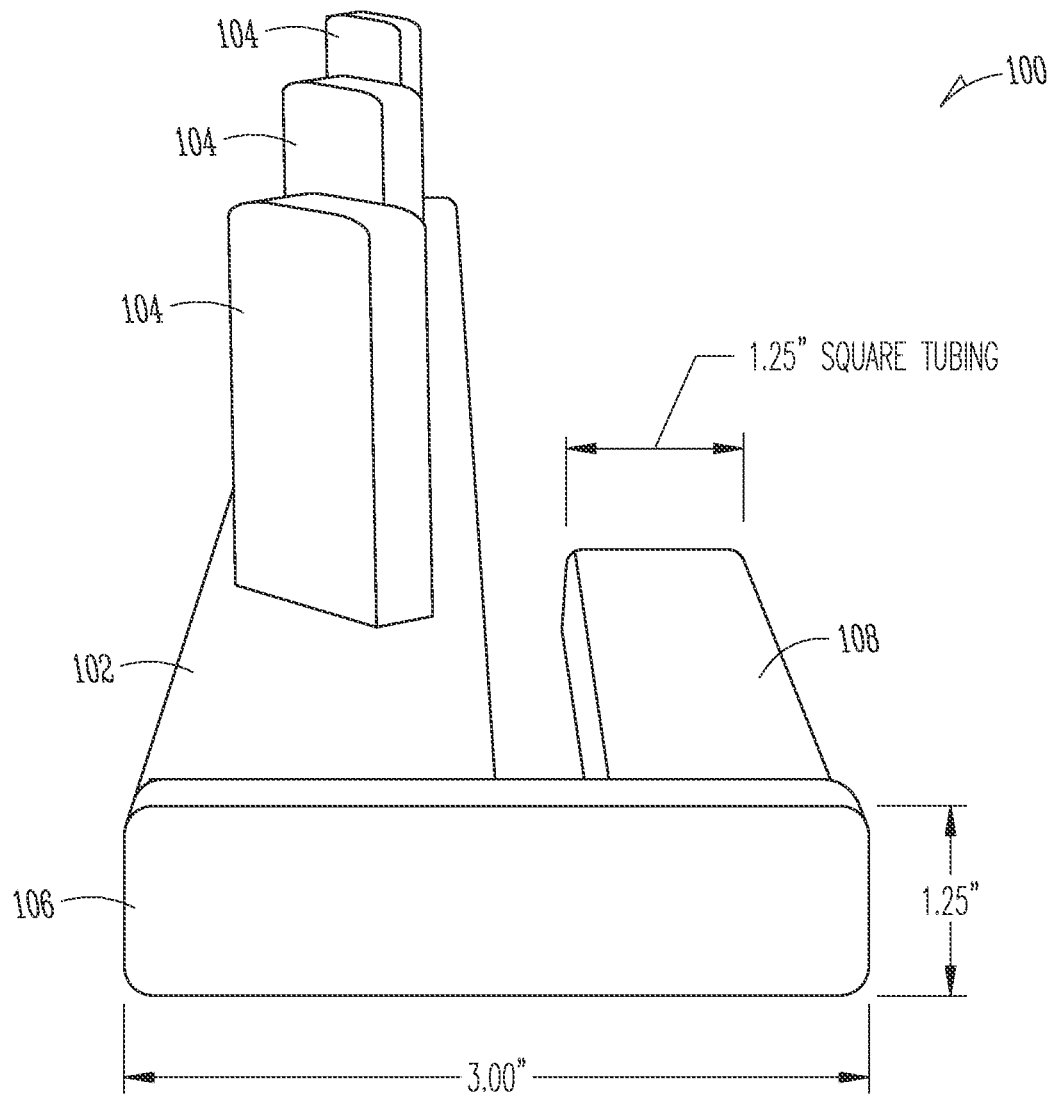
Figure 1D:
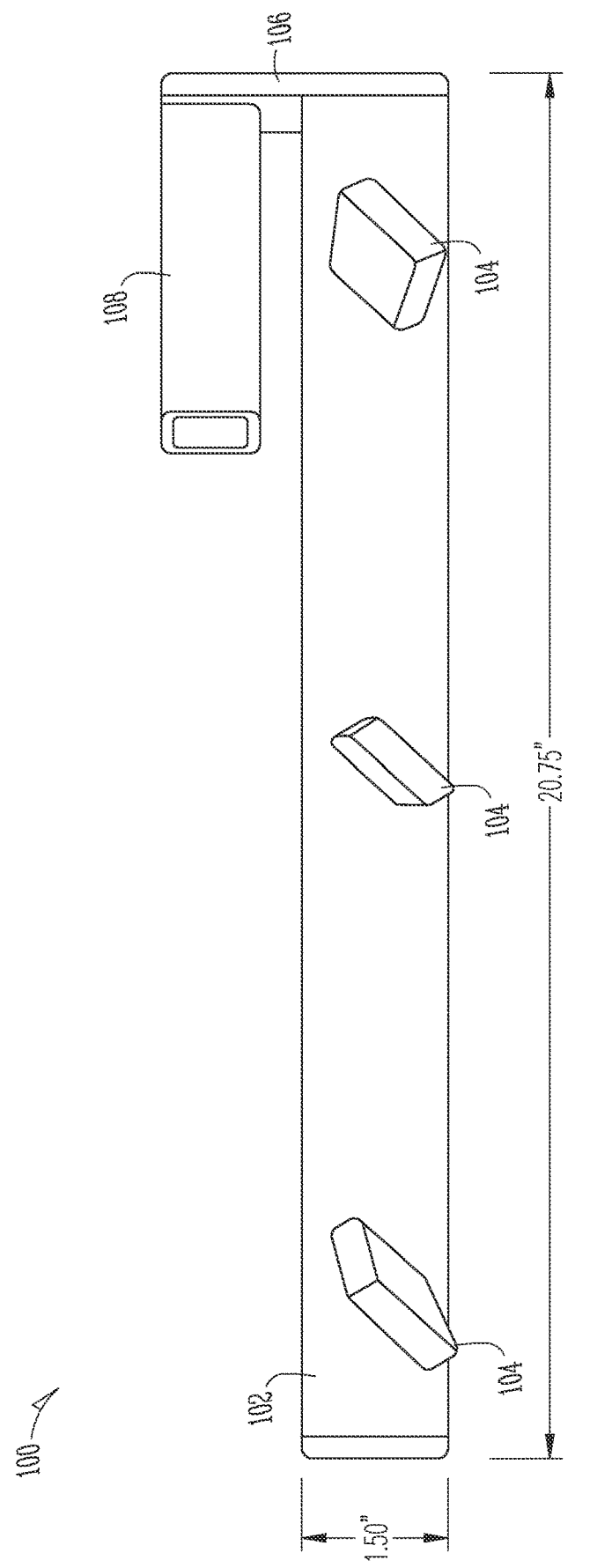

FIGS. 1A-1D illustrate various views of an apparatus 100 for wheel dolly storage, according to various embodiments of the present subject matter. FIG. 1A illustrates a front view of the apparatus 100 for wheel dolly storage, according to an embodiment. FIG. 1B illustrates a back view of the apparatus 100 for wheel dolly storage, according to an embodiment. FIG. 1C illustrates a side view of the apparatus 100 for wheel dolly storage, according to an embodiment. FIG. 1D illustrates a top view of the apparatus 100 for wheel dolly storage, according to an embodiment.

As depicted in FIGS. 1A-1D, one aspect of the present subject matter includes the apparatus 100 having a first elongated arm 102 and a plurality of vertical support structures 104 configured to be affixed to a horizontal surface of the first elongated arm 102. Each of the plurality of vertical support structures 104 is configured to be inserted into an end portion of a wheel dolly to support the wheel dolly in a substantially vertical orientation. The apparatus 100 also includes a connector portion 106 configured to be affixed to an end of the first elongated arm 102 such that the connector portion 106 is substantially perpendicular to the first elongated arm. A second arm 108 is configured to be affixed to the connector portion 106 on a first end such that the second arm is substantially parallel with the first elongated arm 102. A second end of the second arm 108 opposite the first end is configured to be inserted into an end portion of a base wheel dolly while the first elongated arm 102 rests on the base wheel dolly such that casters of the base wheel dolly provide support and maneuverability for the apparatus.

According to various embodiments, the first elongated arm 102 includes a rectangular metal tube. The second arm 108 includes a square metal tube, in an embodiment. In various embodiments, the second end of the second arm 108 includes an angled cut. In various embodiments, different angled cuts may be used. For example, in one embodiment an approximately sixty degree angle cut is used. Other configurations and angles may be employed without departing from the scope of the present subject matter. For example, angle cuts may be provided at angles of approximately 25 degrees to approximately 70 degrees. In various embodiments, the connector portion 106 includes a solid rectangular piece of metal. Each of the plurality of vertical support structures 104 includes a solid rectangular piece of metal, in various embodiments. One of ordinary skill in the art will recognize that other materials, angles, and shapes may be used without departing from the scope of the present subject matter.

In various embodiments, the apparatus 100 further includes a holding portion 110 configured to be affixed to an opposite end of the first elongated arm 102 such that the holding portion 110 is substantially perpendicular to the first elongated arm 102 and to the connector portion 106, the holding portion 110 configured to rest on an opposite end portion of the base wheel dolly to prevent the second end of the second arm 108 from sliding out of the base wheel dolly. According to various embodiments, the angled cut of the second end of the second arm 108 allows the second end of the second arm to be inserted into the end portion of the base wheel dolly such that the holding portion 110 can slide over the opposite end portion before resting on the opposite end portion of the base wheel dolly. The base wheel dolly includes four casters, in an embodiment. Wheel dollies with other numbers of casters can be used with the present apparatus without departing from the scope of the present subject matter.

In some embodiments, the vertical support structures 104 are equally spaced apart on the first elongated arm 102. In one embodiment, the vertical support structures 104 are spaced apart 7.25 inches. In some embodiments, the vertical supports structures 104 are equal in length. In other embodiments, the vertical supports structures 104 are unequal in length. In one embodiment, the vertical support structures 104 are three inches in length. The vertical support structures 104 are affixed to the first elongated arm at an angle to provide for ease of insertion into the end portion of the wheel dollies to support the wheel dollies in a vertical orientation, in an embodiment.

In one embodiment, the holding portion includes a 3 inch by 1.5 inch solid piece of metal. In various embodiments, the second arm 108 includes a 5.5 inch long piece of 1.25 inch square metal tubing. According to various embodiments, the first elongated arm 102 includes a 20.75 inch long piece of rectangular metal tubing having a width of 1.5 inches. While the apparatus is shown and referred to as constructed of a metal, one of skill in the art will understand that other materials may be used for construction of the apparatus without departing from the scope of the present subject matter. In addition, other lengths and widths of components may be used without departing from the scope of the present subject matter.

Figure 2:
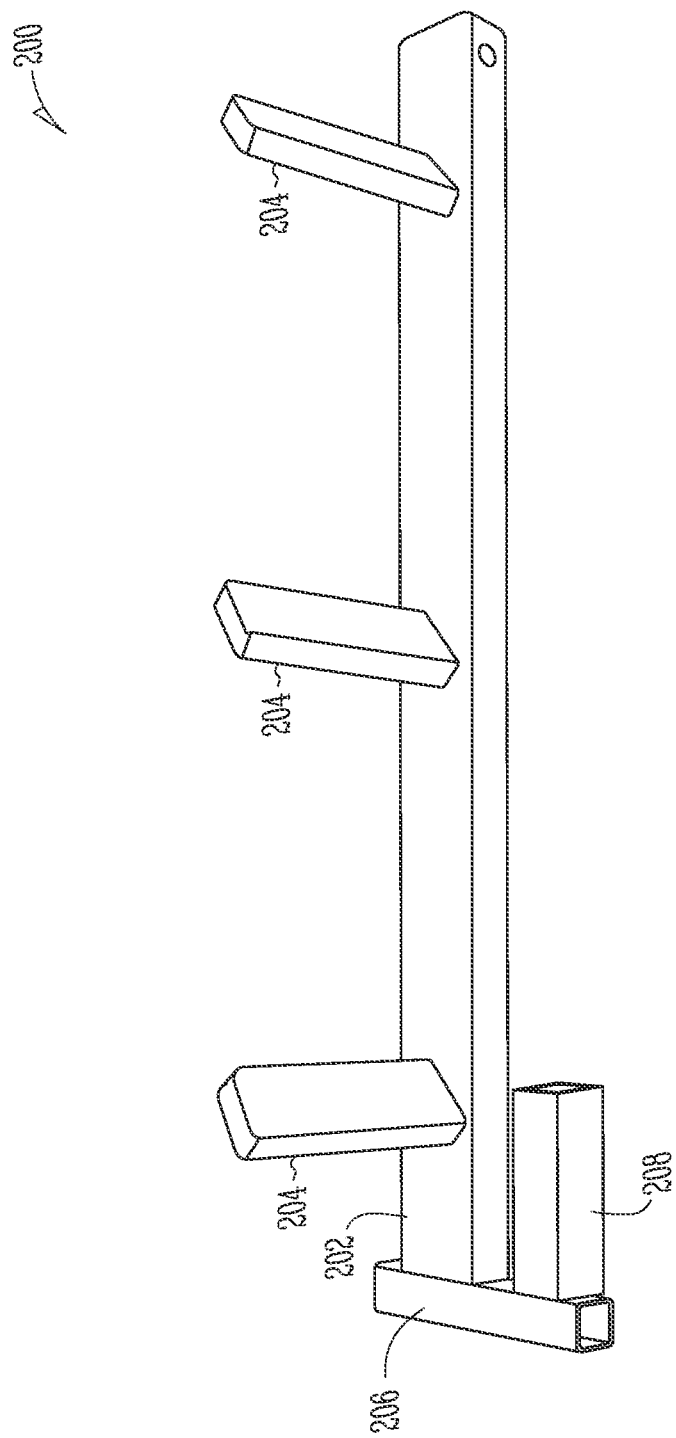
FIG. 2 illustrates an example embodiment of an apparatus for wheel dolly storage.

FIG. 2 illustrates an example embodiment of an apparatus 200 for wheel dolly storage. The apparatus 200 includes a first elongated arm 202 and a plurality of vertical support structures 204 configured to be affixed to the first elongated arm 202. At least one of the plurality of vertical support structures 204 is configured to be inserted into an end portion of a wheel dolly to support the wheel dolly for storage. The apparatus 200 also includes a connector portion 206 configured to be affixed to an end of the first elongated arm 202. A second arm 208 is configured to be affixed to the connector portion 206 on a first end. A second end of the second arm 208 opposite the first end is configured to be inserted into an end portion of a base wheel dolly such that casters of the base wheel dolly provide support and maneuverability for the apparatus.

Figure 3:
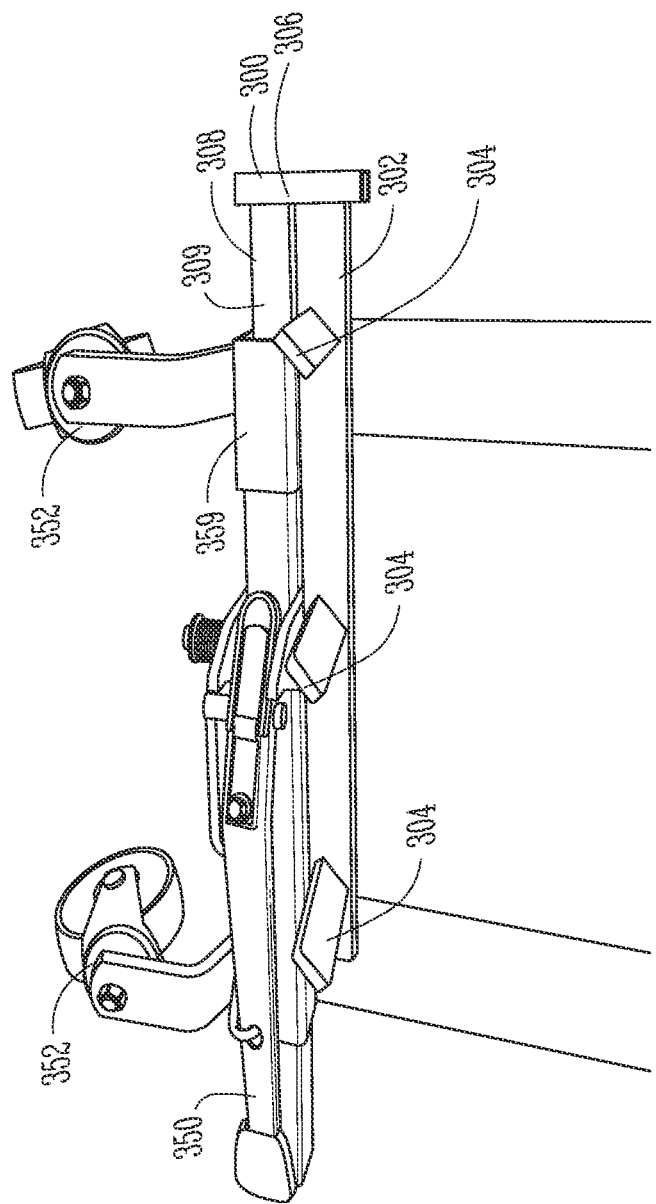
FIG. 3 illustrates an example embodiment of an apparatus for wheel dolly storage with a base wheel dolly.

FIG. 3 illustrates an example embodiment of an apparatus 300 for wheel dolly storage with a base wheel dolly 350. The apparatus 300 includes a first elongated arm 302 and a plurality of vertical support structures 304 configured to be affixed to a horizontal surface of the first elongated arm 302. Each of the plurality of vertical support structures 304 is configured to be inserted into an end portion of a wheel dolly to support the wheel dolly. Any number of vertical support structures 304 may be used. Three vertical support structures 304 are shown in the depicted embodiment. The apparatus 300 also includes a connector portion 306 configured to be affixed to an end of the first elongated arm 302 such that the connector portion 306 is substantially perpendicular to the first elongated arm. A second arm 308 is configured to be affixed to the connector portion 306 on a first end such that the second arm is substantially parallel with the first elongated arm 302. A second end 309 of the second arm 308 opposite the first end is configured to be inserted into an end portion 359 of a base wheel dolly 350 while the first elongated arm 302 rests on the base wheel dolly 350 such that casters 352 of the base wheel dolly 350 provide support and maneuverability for the apparatus 300.

Figure 4:
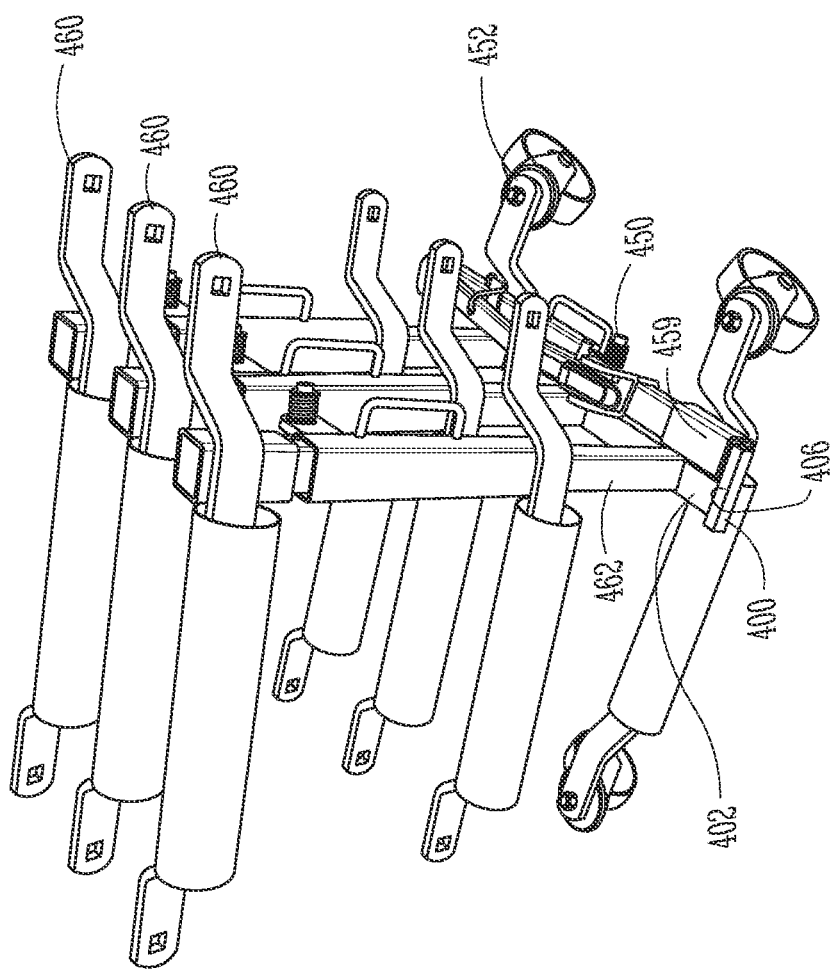
FIG. 4 illustrates an example embodiment of an apparatus for wheel dolly storage with a base wheel dolly and stored wheel dollies.

FIG. 4 illustrates an example embodiment of an apparatus 400 for wheel dolly storage with a base wheel dolly 450 and stored wheel dollies 460. The apparatus 400 includes a first elongated arm 402 and a plurality of vertical support structures configured to be affixed to a horizontal surface of the first elongated arm 402. Each of the plurality of vertical support structures is hidden in the depicted embodiment as each of the vertical support structures are inserted into an end portion 462 of a wheel dolly 460 to support the wheel dolly 460 in a vertical orientation. The apparatus 400 also includes a connector portion 406 configured to be affixed to an end of the first elongated arm 402 such that the connector portion 406 is substantially perpendicular to the first elongated arm. A second arm is configured to be affixed to the connector portion 406 on a first end such that the second arm is substantially parallel with the first elongated arm 402. The second arm is hidden in the depicted embodiment as the second arm has been inserted into an end portion 459 of a base wheel dolly 450 while the first elongated arm 402 rests on the base wheel dolly 450 such that casters 452 of the base wheel dolly 450 provide support and maneuverability for the apparatus 400.

Figure 5:
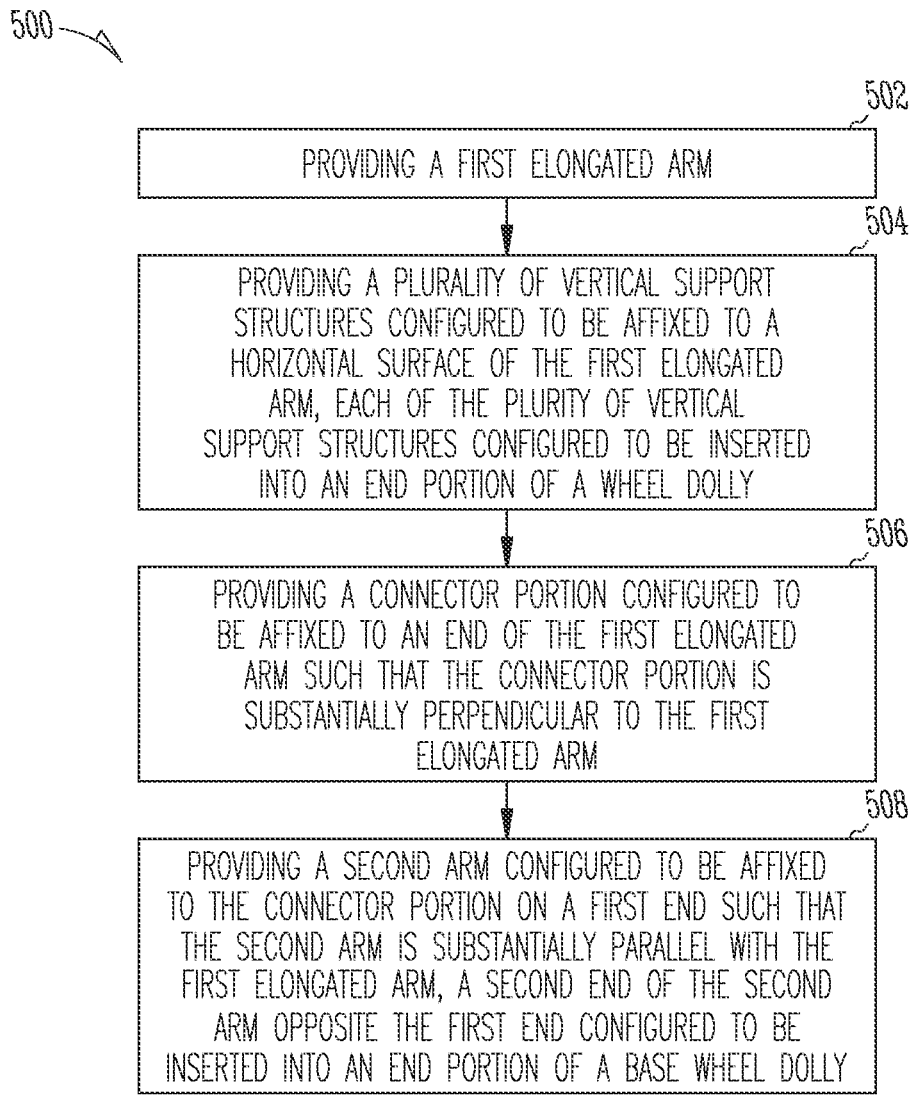
FIG. 5 is a flow chart illustrating a method for making an apparatus for wheel dolly storage, according to various embodiments of the present subject matter.

FIG. 5 is a flow chart illustrating a method 500 for making an apparatus for wheel dolly storage, according to various embodiments of the present subject matter. The method 500 includes providing a first elongated arm, at step 502, and providing a plurality of vertical support structures configured to be affixed to a horizontal surface of the first elongated arm at step 504, each of the plurality of vertical support structures configured to be inserted into an end portion of a wheel dolly to support the wheel dolly in a vertical orientation. The method 500 further includes providing a connector portion configured to be affixed to an end of the first elongated arm such that the connector portion is substantially perpendicular to the first elongated arm, at step 506. At step 508, the method 500 also includes providing a second arm configured to be affixed to the connector portion on a first end such that the second arm is substantially parallel with the first elongated arm, a second end of the second arm opposite the first end configured to be inserted into an end portion of a base wheel dolly.

According to various embodiments, the first elongated arm includes a rectangular metal tube. The second arm includes a square metal tube, in an embodiment. The second end of the second arm includes an angled cut, in various embodiments. In one embodiment, the angled cut includes an approximately sixty degree angled cut. Other configurations and angles may be employed without departing from the scope of the present subject matter. For example, angle cuts may be provided at angles of approximately 25 degrees to approximately 70 degrees. The connector portion includes a solid rectangular piece of metal, in various embodiments. In some embodiments, each of the plurality of vertical support structures includes a solid rectangular piece of metal.

In various embodiments, the method further includes providing a holding portion configured to be affixed to an opposite end of the first elongated arm such that the holding portion is substantially perpendicular to the first elongated arm and to the connector portion, the holding portion configured to rest on an opposite end portion of the base wheel dolly to prevent the second end of the second arm from sliding out of the base wheel dolly. In some embodiments, the angled cut of the second end of the second arm allows the second end of the second arm to be inserted into the end portion of the base wheel dolly such that the holding portion can slide over the opposite end portion before resting on the opposite end portion of the base wheel dolly. The base wheel dolly includes four casters, in an embodiment.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. An apparatus comprising:
   a first elongated arm;
   a plurality of vertical support structures configured to be affixed to a horizontal surface of the first elongated arm, each of the plurality of vertical support structures configured to be inserted into an end portion of a wheel dolly to support the wheel dolly in a vertical orientation;
   a connector portion configured to be affixed to an end of the first elongated arm such that the connector portion is substantially perpendicular to the first elongated arm; and
   a second arm configured to be affixed to the connector portion on a first end such that the second arm is substantially parallel with the first elongated arm, a second end of the second arm opposite the first end configured to be inserted into an end portion of a base wheel dolly while the first elongated arm rests on the base wheel dolly such that casters of the base wheel dolly provide support and maneuverability for the apparatus.

2. The apparatus of claim 1, wherein the first elongated arm includes a rectangular metal tube.

3. The apparatus of claim 1, wherein the second arm includes a square metal tube.

4. The apparatus of claim 1, wherein the second end of the second arm includes an angled cut.

5. The apparatus of claim 4, wherein the angled cut includes an approximately twenty-five degree to approximately seventy degree angled cut.

6. The apparatus of claim 4, further comprising:
   a holding portion configured to be affixed to an opposite end of the first elongated arm such that the holding portion is substantially perpendicular to the first elongated arm and to the connector portion, the holding portion configured to rest on an opposite end portion of the base wheel dolly to prevent the second end of the second arm from sliding out of the base wheel dolly,
   wherein the angled cut of the second end of the second arm allows the second end of the second arm to be inserted into the end portion of the base wheel dolly such that the holding portion can slide over the opposite end portion before resting on the opposite end portion of the base wheel dolly.

7. The apparatus of claim 1, wherein the connector portion includes a solid rectangular piece of metal.

8. The apparatus of claim 1, wherein each of the plurality of vertical support structures includes a solid rectangular piece of metal.

9. The apparatus of claim 1, further comprising:
   a holding portion configured to be affixed to an opposite end of the first elongated arm such that the holding portion is substantially perpendicular to the first elongated arm and to the connector portion, the holding portion configured to rest on an opposite end portion of the base wheel dolly to prevent the second end of the second arm from sliding out of the base wheel dolly.

10. The apparatus of claim 1, wherein the base wheel dolly includes four casters.

11. A method comprising:
    providing a first elongated arm;
    providing a plurality of vertical support structures configured to be affixed to a horizontal surface of the first elongated arm, each of the plurality of vertical support structures configured to be inserted into an end portion of a wheel dolly to support the wheel dolly in a vertical orientation;
    providing a connector portion configured to be affixed to an end of the first elongated arm such that the connector portion is substantially perpendicular to the first elongated arm; and providing a second arm configured to be affixed to the connector portion on a first end such that the second arm is substantially parallel with the first elongated arm, a second end of the second arm opposite the first end configured to be inserted into an end portion of a base wheel dolly while the first elongated arm rests on the base wheel dolly.

12. The method of claim 11, wherein the first elongated arm includes a rectangular metal tube.

13. The method of claim 11, wherein the second arm includes a square metal tube.

14. The method of claim 11, wherein the second end of the second arm includes an angled cut.

15. The method of claim 14, wherein the angled cut includes an an approximately twenty-five degree to approximately seventy degree angled cut.

16. The method of claim 14, further comprising:
providing a holding portion configured to be affixed to an opposite end of the first elongated arm such that the holding portion is substantially perpendicular to the first elongated arm and to the connector portion, the holding portion configured to rest on an opposite end portion of the base wheel dolly to prevent the second end of the second arm from sliding out of the base wheel dolly, wherein the angled cut of the second end of the second arm allows the second end of the second arm to be inserted into the end portion of the base wheel dolly such that the holding portion can slide over the opposite end portion before resting on the opposite end portion of the base wheel dolly.

17. The method of claim 11, wherein the connector portion includes a solid rectangular piece of metal.

18. The method of claim 11, wherein each of the plurality of vertical support structures includes a solid rectangular piece of metal.

19. The method of claim 11, further comprising:
providing a holding portion configured to be affixed to an opposite end of the first elongated arm such that the holding portion is substantially perpendicular to the first elongated arm and to the connector portion, the holding portion configured to rest on an opposite end portion of the base wheel dolly to prevent the second end of the second arm from sliding out of the base wheel dolly.

20. The method of claim 11, wherein the base wheel dolly includes four casters.

* * * * *